A. H. NELLER.
COUPLING FOR PIPES, SHAFTS, &c.
APPLICATION FILED AUG. 23, 1909.

970,737.

Patented Sept. 20, 1910.

2 SHEETS—SHEET 1.

Witnesses:—
Roy Louden
Edw. C. Clarke

Inventor
Albert H. Neller

UNITED STATES PATENT OFFICE.

ALBERT H. NELLER, OF FAIRFIELD, IOWA, ASSIGNOR TO LOUDEN MACHINERY COMPANY, OF FAIRFIELD, IOWA, A CORPORATION OF IOWA.

COUPLING FOR PIPES, SHAFTS, &c.

970,737. Specification of Letters Patent. Patented Sept. 20, 1910.

Application filed August 23, 1909. Serial No. 514,260.

*To all whom it may concern:*

Be it known that I, ALBERT H. NELLER, residing at Fairfield, in the county of Jefferson and State of Iowa, have invented a new and useful Improvement in Couplings for Pipes, Shafts, &c., of which the following is a specification.

My invention relates to a coupling for pipes, shafts, bars, etc., to be joined together without threading the parts, and it consists of a clamp comprising two or more members applied to the adjoining ends of the parts, and held in place by bolts passed through lugs on the members, the central portions of the members being made light in cross section, and of springy or compressible material so as to conform readily to the contour of the parts being held together while the lugs are spaced apart and are provided on their outer edges with inwardly extended mating flanges. Also, of other features hereinafter described, and specifically pointed out in the claims.

Figure 1:
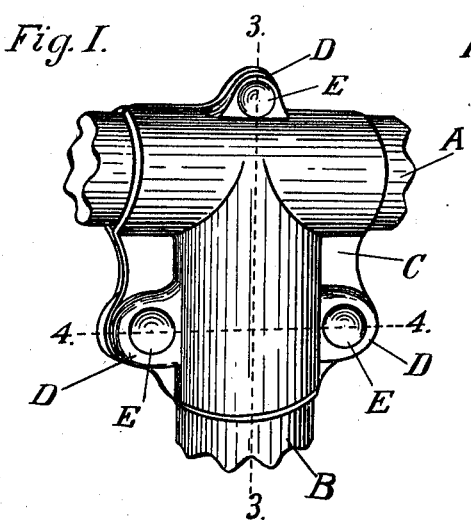
Figure 2:
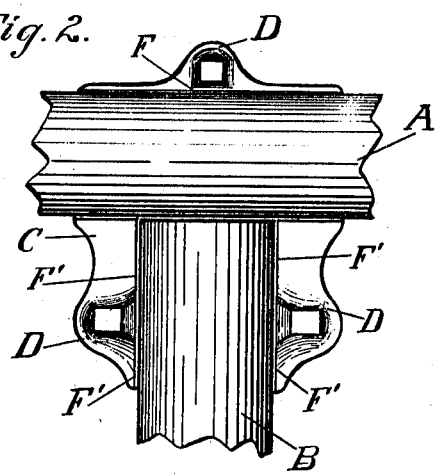
Figure 4:
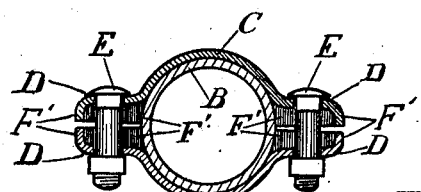
Figure 3:
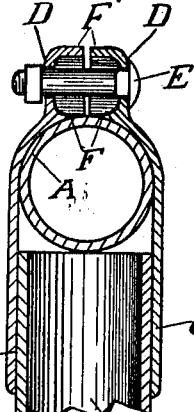
Figure 5:
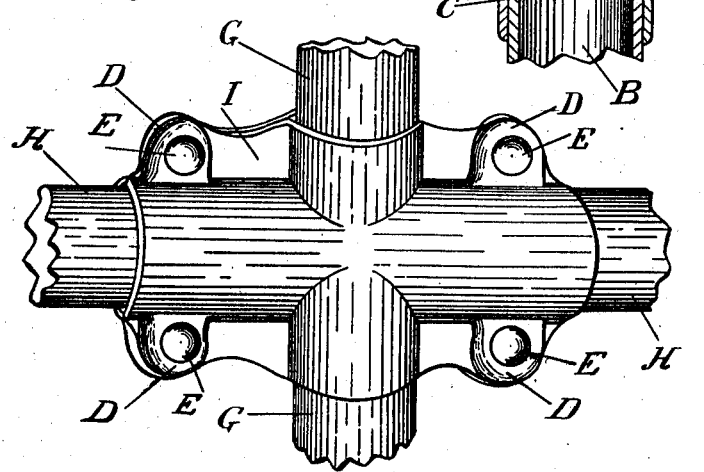
Figure 6:
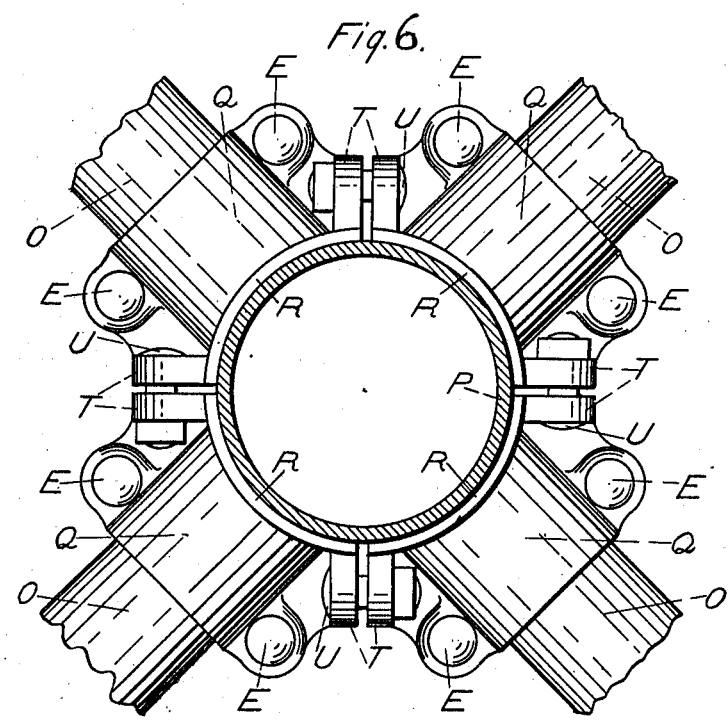

In the accompanying drawings forming a part of this specification, Figure 1 is a perspective of a two-part clamp joining two pipes together at substantially right angles to each other, and embodying features of my invention. Fig. 2 is a side view of the same, the front members of the clamp and the bolts being removed. Fig. 3 is a transverse section on line 3—3 of Fig. 1. Fig. 4 is the same on line 4—4 of Fig. 1. Fig. 5 is a perspective of a two-part clamp holding three pieces of pipes together so as to form substantially a cross. Fig. 6 is a plan view of a series of clamps, joining 4 smaller pieces of pipe to one large one, the larger pipe being shown in cross section.

Referring to the drawings, A and B represent two sections of pipe or tubing disposed at right angles to each other and held together by a clamp composed of mating members C, each of which is provided with lugs or ears D, having holes or openings through which bolts E are passed. The members C are made of malleable iron or other springy or compressible material, and their bodies are made thin and without stiffening ribs or flanges to permit them when drawn together to more readily conform to the contour of the pipes or shafts to be held by the clamp. The lugs or ears D are set back some distance from the meeting edges of the members C which leaves considerable space between them, and inwardly extended mating flanges F' are formed on their outer edges. These flanges have their inner ends joined to the body of the member to which their respective lugs are attached, and being placed around the edges of the lugs they greatly strengthen them, and also permit them to be made as thin and light as the bodies of the members without impairing the rigidity of the lugs required to hold the clamp in place. They also, provide recesses or cups between the lugs and around the central portions of the bolts E, into which cement or other filling material may be placed, and be securely held therein, to render the coupling more sanitary by completely closing the openings between the lugs and thus preventing the accumulation of dirt or disease germs in said openings. By this means a two part coupling is produced which is economical to manufacture and which will securely hold the parts of a structure together and which may be quickly and easily placed in position or removed from any part of the structure without disturbing other parts, and at the same time, be made as sanitary or hygienic as a solid threaded coupling.

If preferred, the meeting edges of the members under the lugs D, and between the inner ends of the flanges F', may be cut away as shown in Fig. 4; or they may be left intact to form ribs F, as shown in Fig. 3. If left intact the ribs F will add something to the rigidity of the lugs and will form a more extended surface to bear against the pipe or bar to be held. However, if removed, the meeting edges of the members C adjacent the lugs, and particularly the inner ends of the flanges F' which are joined to said edges, will provide a sufficient bearing surface to hold the parts securely together.

Fig. 5 represents a form of clamp designed to hold three pipes together substantially in the shape of a cross, G being the main or continuous pipe and H the two pipes held in position thereon, while the clamp pieces holding the same together are represented by I. The construction is the same as in Fig. 1 except that the clamp pieces are cross shaped instead of being T shaped.

The coupling shown in Fig. 6 is intended to hold four smaller pieces of pipe O in connection with one larger piece P. It consists of four sets of two part clamps Q, each adapted to hold one end of the pipes O in the manner already described. The inner end of each of the parts of these clamps is provided with a quadrant shaped flange R adapted to fit against the adjoining portion of the pipe P. They are also provided with side flanges T adjoining each other through which bolts U are passed so as to hold the clamp pieces in engagement with the pipe. In this way each of the clamps Q will hold one end of the pipes O, while the pipe P will be held by the combined pressure of all the flanges R. The couplings are shown in the drawing as holding pipes at substantially right angles to each other, but it is evident the angles may be varied to suit requirements and that the coupling may be made to hold pipes running parallel to each other, or even in the same alinement.

By changing the contour of the contacting parts of the members comprising the clamp they may be adapted to hold bars of various shapes, as well as in various relative positions to each other. If one set of lugs on a side is not sufficient to hold the parts securely together, additional lugs may be added as required. It is also preferable that the meeting edges of the members and of the flanges F' should be a little apart when the members are drawn together.

What I claim is:—

1. In couplings for pipes, shafts, etc., a pair of mating members having bodies adapted to conform approximately to the contour of the parts to be held, mating lugs formed on the bodies of the members so as to stand a distance apart, inwardly extended mating flanges on the outer edges of the lugs, and means applied to the lugs to hold the members together.

2. In couplings for pipes, shafts, etc., a pair of mating members having bodies adapted to conform approximately to the contour of the parts to be held, mating lugs formed on the bodies of the members so as to stand a distance apart, inwardly extended mating flanges on the outer edges of the lugs having their inner ends joined to the meeting edges of the members, and means applied to the lugs to hold the members together.

3. In couplings for pipes, shafts, etc., a pair of mating members having bodies made thin and of springy or compressible material and adapted to conform to the general contour of the parts to be held, mating lugs formed on the bodies of the members so as to stand a distance apart, inwardly extended mating flanges on the outer edges of the lugs, and means applied to the lugs to hold the members together.

4. In couplings for pipes, shafts, etc., a pair of mating members having bodies made thin and of springy or compressible material and adapted to conform to the general contour of the parts to be held, mating lugs formed on the bodies of the members so as to stand a distance apart and have openings therein, inwardly extended mating flanges on the outer edges of the lugs around the openings, and bolts passed through the openings in the lugs to hold the members together.

5. In couplings for pipes, shafts, etc., a series of clamps each adapted to hold the end of a pipe or bar and curved flanges one on one end of each of the clamps adapted to fit against a larger pipe or bar, and means to connect the clamps together so as to grip and hold said larger pipe or bar.

6. In couplings for pipes, shafts, etc., a series of clamps each adapted to hold the end of a pipe or bar and curved flanges on one end of each of the clamps adapted to fit against a larger pipe or bar, flanges with holes on the adjoining sides of the clamp parts, and bolts passed through the holes in the flanges so as to grip and hold the larger pipe or bar.

ALBERT H. NELLER.

Witnesses:
LAURA KAMP,
ROY LOUDEN.